United States Patent
Kim

(10) Patent No.: US 8,351,106 B2
(45) Date of Patent: Jan. 8, 2013

(54) ELASTOMERIC DEVICE FOR TUNABLE IMAGING

(75) Inventor: Jaeyoun Kim, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 13/180,668

(22) Filed: Jul. 12, 2011

(65) Prior Publication Data

US 2012/0013967 A1 Jan. 19, 2012

Related U.S. Application Data

(60) Provisional application No. 61/363,776, filed on Jul. 13, 2010.

(51) Int. Cl.
*G02B 26/00* (2006.01)
*G02B 27/10* (2006.01)

(52) U.S. Cl. ........ 359/290; 359/291; 359/619; 359/665; 359/666; 137/825

(58) Field of Classification Search .................. 359/290, 359/291, 245, 619, 665, 666, 823; 353/31, 353/38, 69, 121; 264/1.1, 1.36; 137/825, 137/832, 833; 623/4.1; 73/715; 250/227.28; 442/68.1, 82.01
See application file for complete search history.

(56) References Cited

U.S. PATENT DOCUMENTS

| | | | |
|---|---|---|---|
| 7,246,524 B1 * | 7/2007 | Kholwadwala et al. ......... | 73/715 |
| 7,256,943 B1 * | 8/2007 | Kobrin et al. .................. | 359/666 |
| 7,554,743 B2 | 6/2009 | Jiang et al. | |
| 7,672,058 B2 | 3/2010 | Jiang et al. | |
| 2009/0165876 A1 * | 7/2009 | Atkin et al. .................... | 137/825 |
| 2009/0314929 A1 * | 12/2009 | Lee et al. .................. | 250/227.28 |
| 2010/0042209 A1 * | 2/2010 | Guarnieri ....................... | 623/4.1 |
| 2010/0177411 A1 * | 7/2010 | Hegde et al. .................. | 359/823 |
| 2011/0051254 A1 * | 3/2011 | Lee et al. ...................... | 359/666 |

OTHER PUBLICATIONS

Jeong, Ki-Hun et al., "Biologically Inspired Artificial Compound Eyes", Science, vol. 312, Apr. 28, 2006, pp. 557-561.
Kim, Jaeyoun et al., "Artificial ommatidia by self-aligned microlenses and waveguides", Optics Letters, vol. 30, No. 1, Jan. 1, 2005, pp. 5-7.

* cited by examiner

*Primary Examiner* — Loha Ben
(74) *Attorney, Agent, or Firm* — McKee, Voorhees & Sease, P.L.C.

(57) ABSTRACT

An optical micro-electro-mechanical systems (MEMS) structure is provided. The structure includes an elastomer membrane, a plurality of polymer fibers attached to the elastomer membrane, an array of detectors operatively connected to the plurality of polymer fibers at a first end of the plurality of polymer fibers, and a microlens array operatively connected to the plurality of polymer fibers at a second end of the plurality of polymer fibers. A method of manufacturing an optical MEMS structure is provided. The method includes forming a hollow PDMS chamber in which PDMS fibers extend from top to bottom using a lost wax molding process.

22 Claims, 10 Drawing Sheets

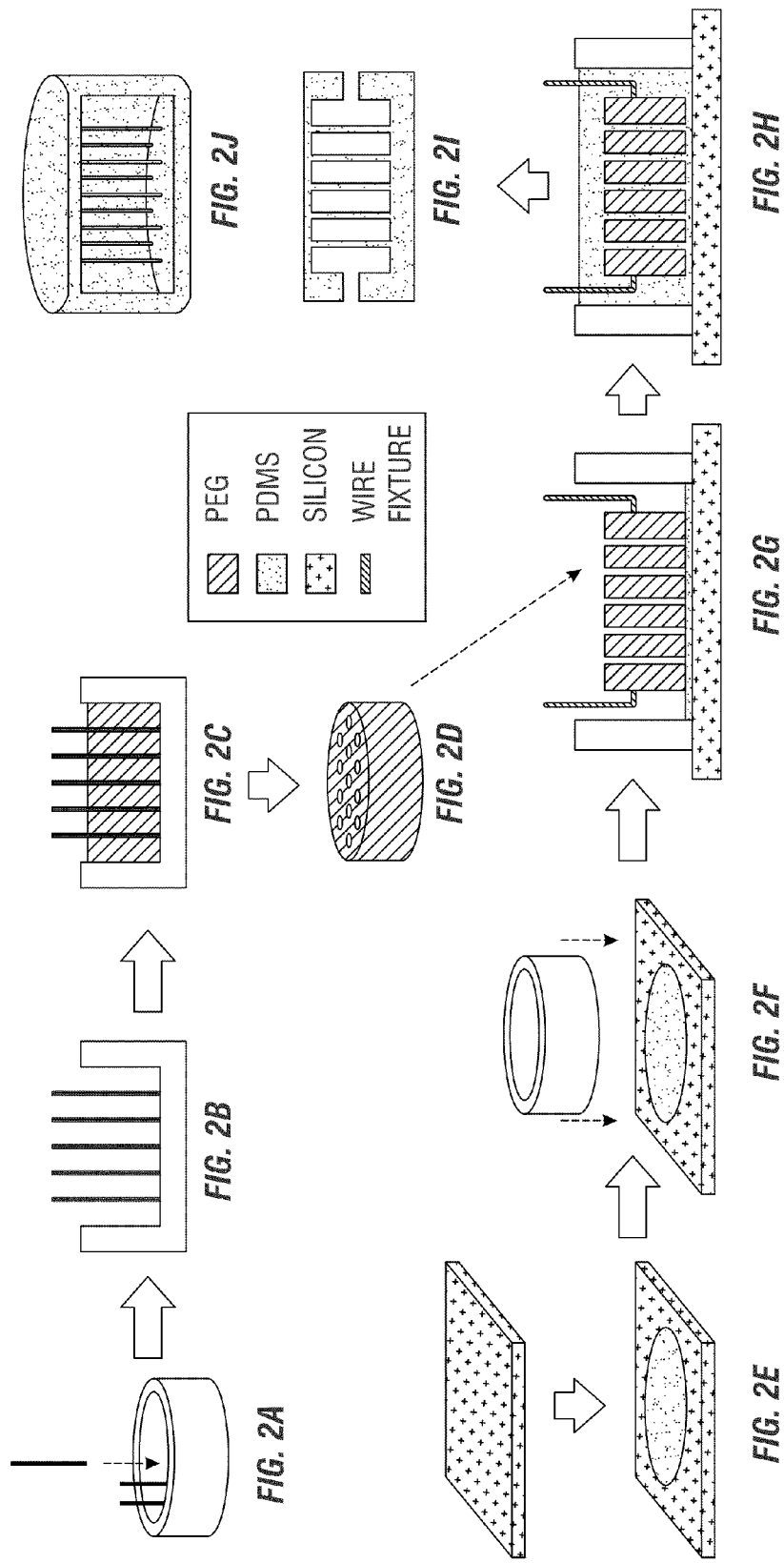

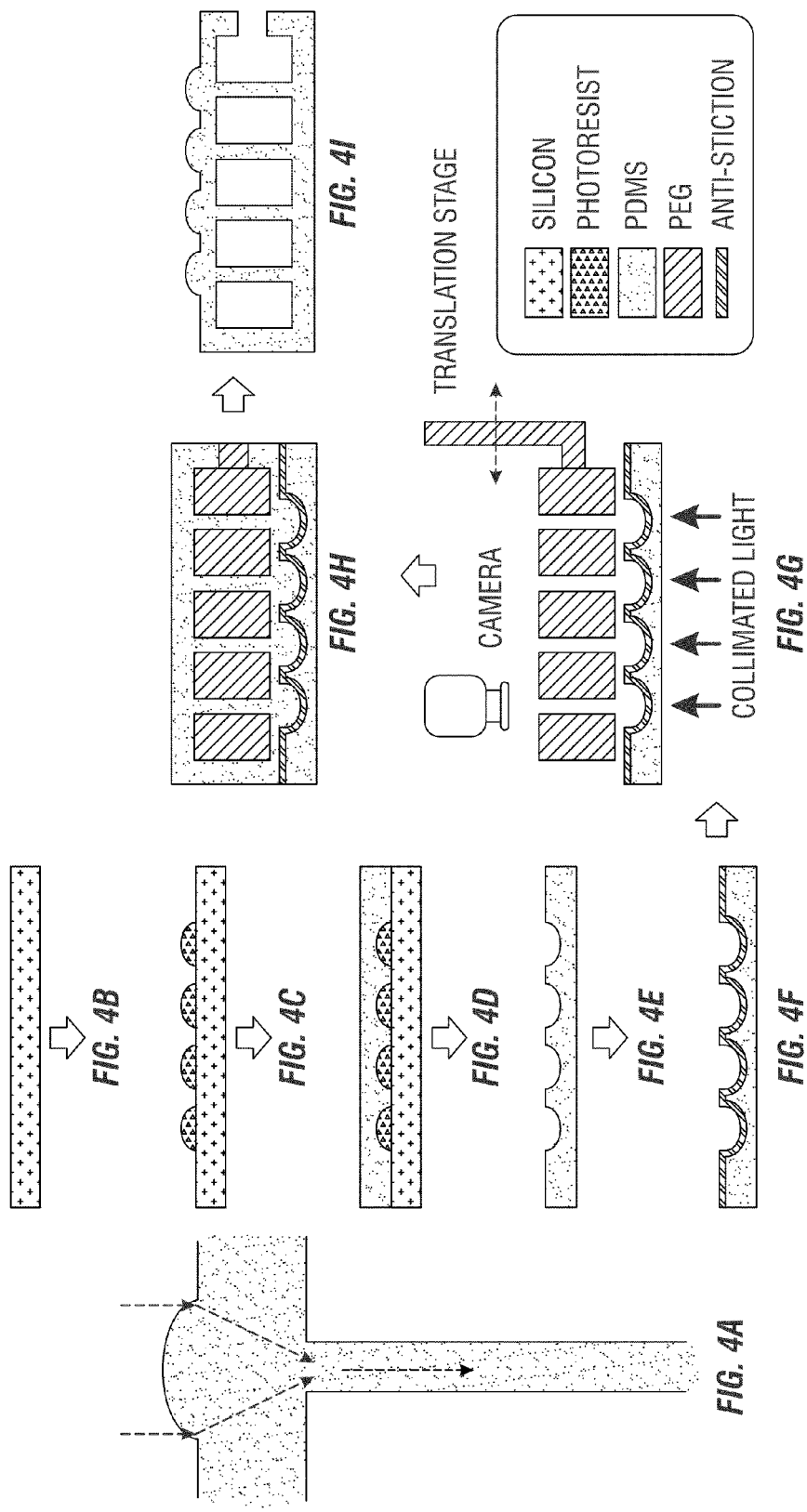

ELASTOMERIC DEVICE FOR TUNABLE IMAGING

CROSS-REFERENCE TO RELATED APPLICATIONS

This application claims priority under 35 U.S.C. §119 to provisional application Ser. No. 61/363,776 filed Jul. 13, 2010, herein incorporated by reference in its entirety.

GRANT REFERENCE

This invention was made with government support under Grant Number ECCS0954845 awarded by National Science Foundation. The government has certain rights in the invention.

FIELD OF THE INVENTION

The present invention relates to curved focal planes. More specifically, but not exclusively, the present invention relates to an optical MEMS interface for highly curved focal plane arrays.

BACKGROUND OF THE INVENTION

Recently, curved focal plane arrays (FPAs) attract significant research interest for their vast application potential. Typical lens-based optical systems cast their images on curved focal planes which need to be "flattened" with considerable design and fabrication efforts to suit inherently flat semiconductor photodetector arrays. Adopting curved FPAs can greatly simplify the realization of imaging systems. In fact, most single-aperture camera-eyes in nature, including human eyes, utilize curved FPAs. Furthermore, curved FPAs also excel in achieving peripheral vision, leading to a greatly widened field-of-view (FOV). In nature, cephalopod eyes achieve over 90 degrees of viewing angle by combining a single spherical lens with a highly curved retinal plane. When miniaturized and mass-produced, curved FPAs will play important roles in compact, wide FOV imaging systems for defense, artificial vision, and medical imaging.

In contrast to the number of reports on macro-scale curved FPAs, their miniaturization based on MEMS technology has been scarce. In some implementations, flat arrays of semiconductor photodetectors were initially fabricated through well-established planar processing techniques and then deformed to achieve desired curvature. Alternatively, the arrays were mounted on elastomeric membranes and the composite structures were deformed as a whole. Morphing semiconductor photodetector arrays to curvature, however, inevitably incurs the wiring problem: Unlike their biological counterparts, the photodetectors must be powered and interfaced through conducting wires and their rigidity sets the limit on the maximum achievable curvature. To date, the most commonly adopted solution has been the use of wavy platforms that can be elongated when stretched. Fabricating arrays of semiconductor photodetectors in wavy form, however, is complex and costly. Given the variety, performance, and cost-effectiveness of flat semiconductor photodetector arrays, their direct use is highly desired.

Therefore, what is needed is an optical MEMS interface for highly curved focal plane arrays and imaging systems and associated apparatus, methods, and systems.

SUMMARY OF THE INVENTION

Therefore, it is a primary object, feature, or advantage of the present invention to improve over the state of the art.

It is a further object, feature, or advantage of the present invention to provide an optical MEMS interface for highly curved focal plane arrays.

Another object, feature, or advantage of the present invention is to provide an imaging device with a truly wide FOV such as one of approximately 150 degrees or more.

A still further object, feature, or advantage of the present invention is to provide a structure that allows for dynamic tuning of FOV.

Another object, feature, or advantage of the present invention is to provide an optical MEMS interface which can interface flat detector arrays with inflated convex optical front-ends as well as deflated concave optical front-ends.

Yet another object, feature, or advantage of the present invention is to provide an elastomeric device for tunable imaging which is easy to make.

These and/or other objects, features, or advantages of the present invention will become apparent from the specification and claims that follow. Different embodiments may exhibit different objects, features, or advantages and no single embodiment need exhibit every object, feature, or advantage. The present invention is not to be limited to or by these objects, features, or advantages.

According to one aspect of the present invention, an optical micro-electro-mechanical systems (MEMS) structure is provided. The structure includes an elastomer membrane, a plurality of polymer fibers attached to the elastomer membrane, an array of detectors operatively connected to the plurality of polymer fibers at a first end of the plurality of polymer fibers, and a microlens array operatively connected to the plurality of polymer fibers at a second end of the plurality of polymer fibers.

According to another aspect of the present invention, a dynamically tunable field of view (FOV) imaging device is provided. The device includes a detector array, a hollow chamber, an elastic membrane, a lens array, a plurality of flexible optical connections between the detector array and the elastic membrane and extending through the hollow chamber, wherein the field of view is dynamically tunable by inflating or deflating the hollow chamber to affect geometry of the elastic membrane.

According to another aspect of the present invention, a method of manufacturing an optical MEMS structure is provided. The method includes forming a hollow PDMS chamber in which PDMS fibers extend from ton to bottom of the PDMS chamber using a lost wax molding process.

BRIEF DESCRIPTION OF THE FIGURES

FIGS. 2A-2J illustrate one example of a manufacturing or fabrication process of the present invention.

FIGS. 4A-4I illustrate a process wherein FIG. 4A illustrates a lensed fiber artificial ommatidium, FIGS. 4B-4C illustrate fabrication of a microlens array using droplet dispensing or photoresist reflow, FIGS. 4D-4E illustrate PDMS replication, FIG. 4F illustrates coating of an anti-stiction layer, FIG. 4G illustrates PEG holed cylinder alignment, FIG. 4H illustrates PDMS replication, and FIG. 4I illustrates dissolving PEG sacrificial material.

In FIG. 6A, the detector array is aligned to the distal ends of the illuminated fibers by monitoring the photocurrent and maximizing it through 3D translation. The detector array is placed on the thin layer and another layer of PDMS is poured. After dissolving the template an imaging device with an encapsulated detector array is formed. The inset shows the AFRL optical detector pixel.

DETAILED DESCRIPTION OF THE PREFERRED EMBODIMENT

Figure 1A:
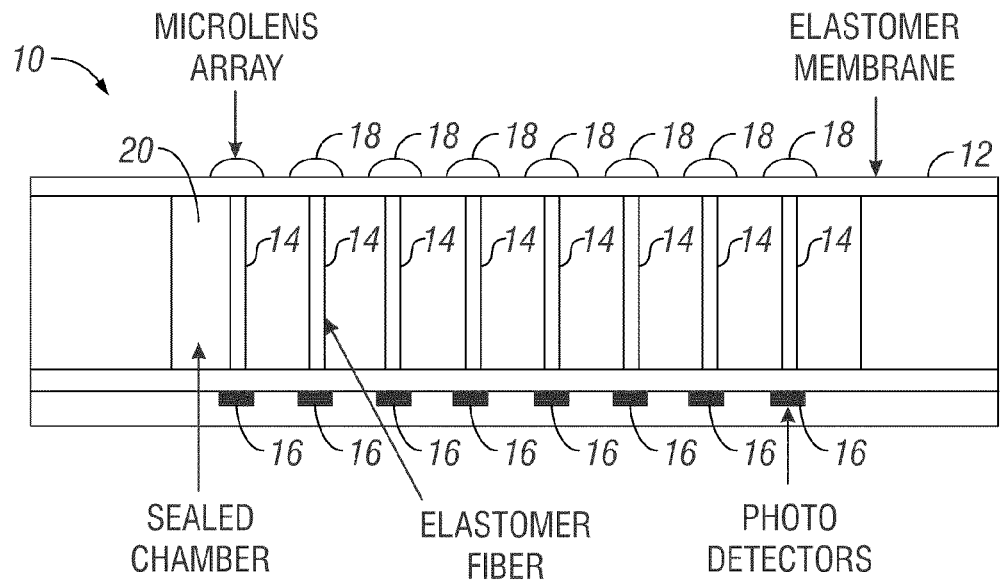
FIG. 1A is a schematic diagram of one embodiment of a MEMS interface of the present invention.

The present invention provides for a bio-inspired elastomeric MEMS interface. The wiring problem is eliminated by deploying passive light-collection optics, which requires no wiring, on a deformable membrane and then relaying the collected light to the flat photodetector array using a bundle of flexible optical fibers. This is shown in FIG. 1A. As shown in FIG. 1A, the MEMS interface 10 includes an array of microlenses 18 positioned along an elastomer membrane 12. Elastomer fibers 14 extend between each microlens 18 and a photodetector 16 through a sealed chamber 20.

Figure 1B:
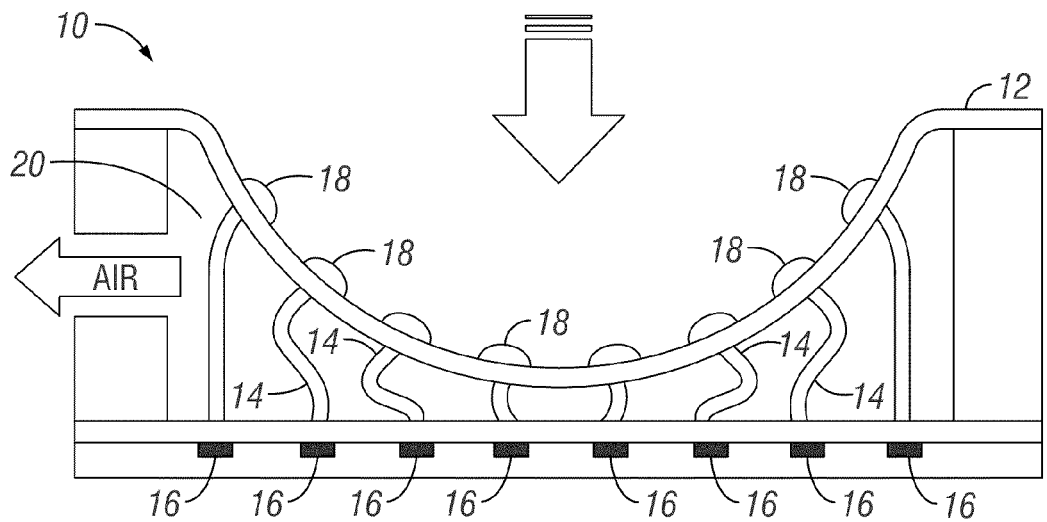
FIG. 1B illustrates realization of dynamically tunable high curved FPA through deflation.
Figure 1C:
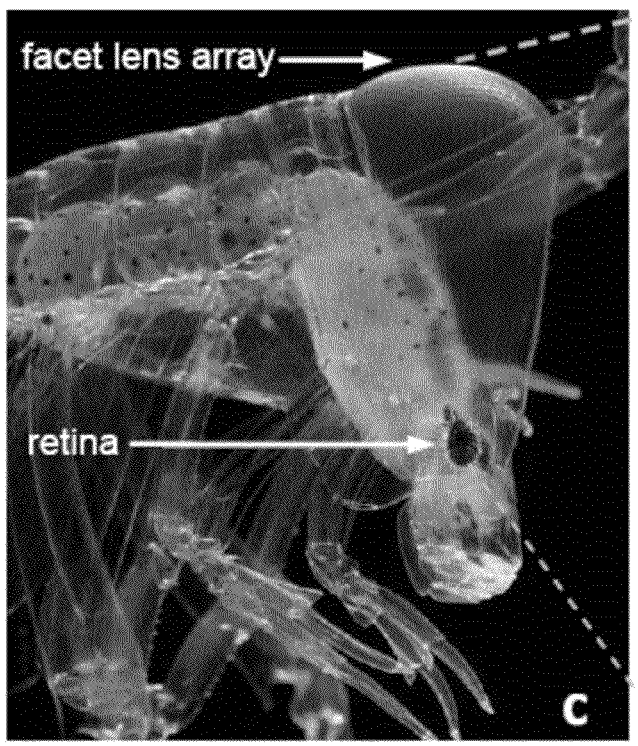
FIG. 1C, FIG. 1D are images of *Phronima sedentaria*'s eye structure which inspired the present invention in part.
Figure 1D:
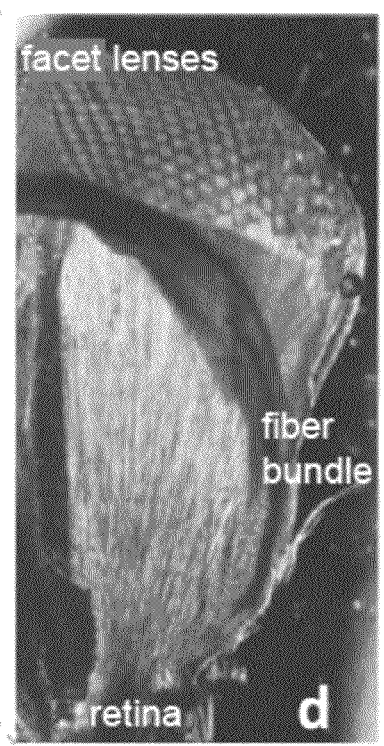

When the membrane and fibers are made of elastomeric materials, the structure can be deflated to form a highly curved FPA as shown in FIG. 1B. The concept of interfacing curved and flat optical structures via optical fibers was inspired by the unique eye structure of *Phronima sedentaria*, a deep-sea amphipod shown in FIG. 1C and FIG. 1D. In a camouflage effort to make its body maximally transparent, the *Phronima sedentaria* packs most of its opaque organs at one place. As a result, its retina, usually the most opaque organ due to the presence of light-absorbing photoreceptors, gets displaced from the light-collecting facet lenses, sometimes by several millimeters. As shown in FIG. 1D, a bundle of thin, flexible optical fibers relay light from the microlens array to the retina. Recently, it was revealed that retinas of vertebrate animals also utilized cylindrical cells as optical fibers to relay focused light from its surface to photoreceptors buried under nerves and blood vessels.

Achieving curvature by deflating an originally flat membrane is advantageous for miniaturization and mass production since the light-collectors and optical fibers can be implemented using standard planar processing techniques, rather than complex techniques specialized for curved structures. Furthermore, the curvature can also be actively controlled via pneumatic, hydraulic, or micro-mechanical means, which enable dynamic reconfiguration of the curved FPAs for variable FOV imaging and fine-tuning. Being exempted from the curvature requirement, the photodetector array can be freely selected to suit applications.

The fabrication process used may provide for efficient production of polymer fibers linking the top, i.e., the deformable membrane, and the substrate and successful deflation of the fiber-attached elastomeric membrane. One example is a fabrication protocol based on lost-wax casting and soft-lithography as shown in FIG. 2A to FIG. 2H. As shown in FIG. 2A and FIG. 2B, wires or optical fibers are planted inside an elastic ring or container. In FIG. 2C, liquid phase polyethylene glycol (PEG) is poured into the container. In FIG. 2D, after solidification and removal from the container, a holed PEG cylinder is obtained. In FIG. 2E, a small amount of PDMS is spun on a separate substrate. In FIG. 2F, a cylindrical container is placed around the thin PDMS layer. In FIG. 2G, the holed PEG cylinder is held with wires and placed on the top of the PDMS layer. In FIG. 2H, more PDMS is poured into the container. In FIG. 2I, after curing of the PDMS, PEG is dissolved by running warm water through the side holes. This leaves a hollow PDMS chamber in which PDMS fibers run top to bottom as shown in FIG. 2J.

PDMS was selected as the material for both the membrane and the fibers for its excellent elasticity, flexibility, ease of replica-molding, and most importantly, optical clarity. As the sacrificial material for PDMS lost-wax molding, PEG was selected for its bio-safety, low melting temperature (60 to 80 degrees C.), and high fidelity replication during solidification. The most beneficial attribute of PEG for this application is its water-solubility since PDMS deforms irreversibly in contact with solvents. Glass optical fibers (125 μm in diameter) or small gauge copper wires were used as the master for the PEG molding process in steps shown in FIG. 2A to FIG. 2C. The protocol bases itself on established soft-lithographic replica molding and is compatible with mass production.

Figure 3A:
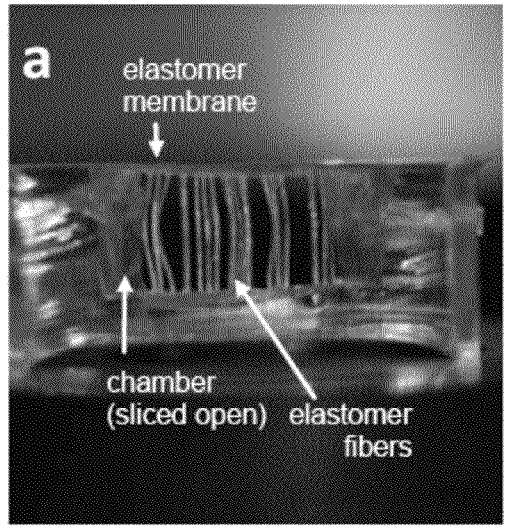
FIG. 3A illustrates a fabricated "fibers-in-a-chamber" structure in cross-sectional view.
Figure 3B:
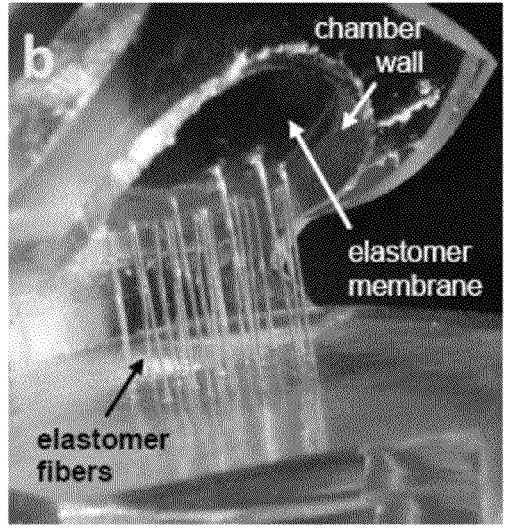
FIG. 3B illustrates the upper part being lifted to test the strength of the fiber's attachment to the membrane.
Figure 3C:
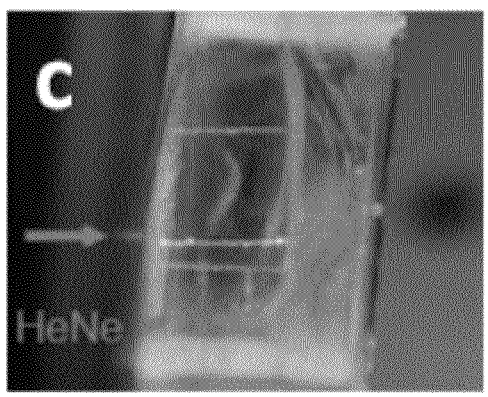
FIG. 3C illustrates a HeNe beam passing through a fiber functioning as a waveguide.
Figure 3D:
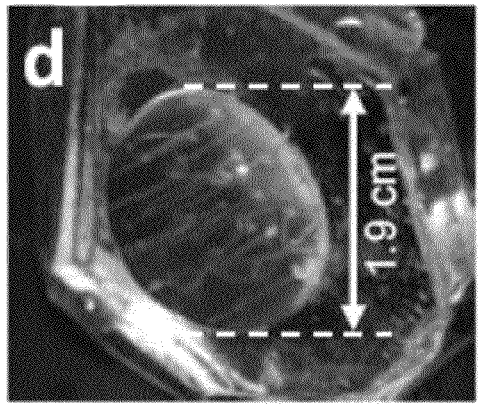
FIG. 3D illustrates results of inflation.

FIG. 3A illustrates the PDMS "fibers-in-a-chamber" structure fabricated by following the protocol. For a clearer view, the chamber was sliced open. The PDMS fiber diameter is approximately 210 μm. As shown in FIG. 3B, the elasticity of the PDMS fiber is sufficient to withstand approximately 200 percent elongation. FIG. 3C illustrates that propagation of HeNe laser light through a pent PDMS fiber. The elastomeric membrane responds well to both inflation and deflation with fibers attached to it. FIG. 3D illustrates inflation.

According to another aspect of the present invention, an imaging system which includes a wide field of view (FOV) imaging platform is provided which uses the previously described optical MEMS interface. The present invention contemplates that the "polymer fiber" bridging structure may be extended into an apposition-type compound eye imaging platform for integration with flat detector arrays. For example, to mimic the apposition-type compound eye, the polymer fibers may be extended into artificial ommatidia which accept light by impinging near normal incidence angle only. Adding a microlens to the fiber as shown in FIG. 4A to FIG. 4I may be performed. The fabrication process used preferably allows simultaneous alignment between multiple microlenses and fibers, as opposed to manual addition of one microlens to each fiber. FIG. 4B to FIG. 4I illustrate one example of a procedure. As shown in FIG. 4H, microlenses fabricated by texturing the bottom of the container with recessed lens patterns. The patterns and the holes for fibers are aligned by imaging the transmission of collimated light through the holes (FIG. 4G). In this process, a transparent, moldable material may be used for the bottom layer. One example of such a material is PDMS. The lens-textured bottom with an anti-stiction coating such as TEFLON. As shown in FIG. 4G, the present invention also contemplates that a PEG structure may be placed at a certain height above the bottom surface, rather than being placed directly on a prespun PDMS layer, and then PDMS is poured over it. This step may be performed in this manner since it is difficult to spin a uniform layer on a textured surface. Leaving openings to the bottom also helps PDMS get into the holes.

Figure 5A:
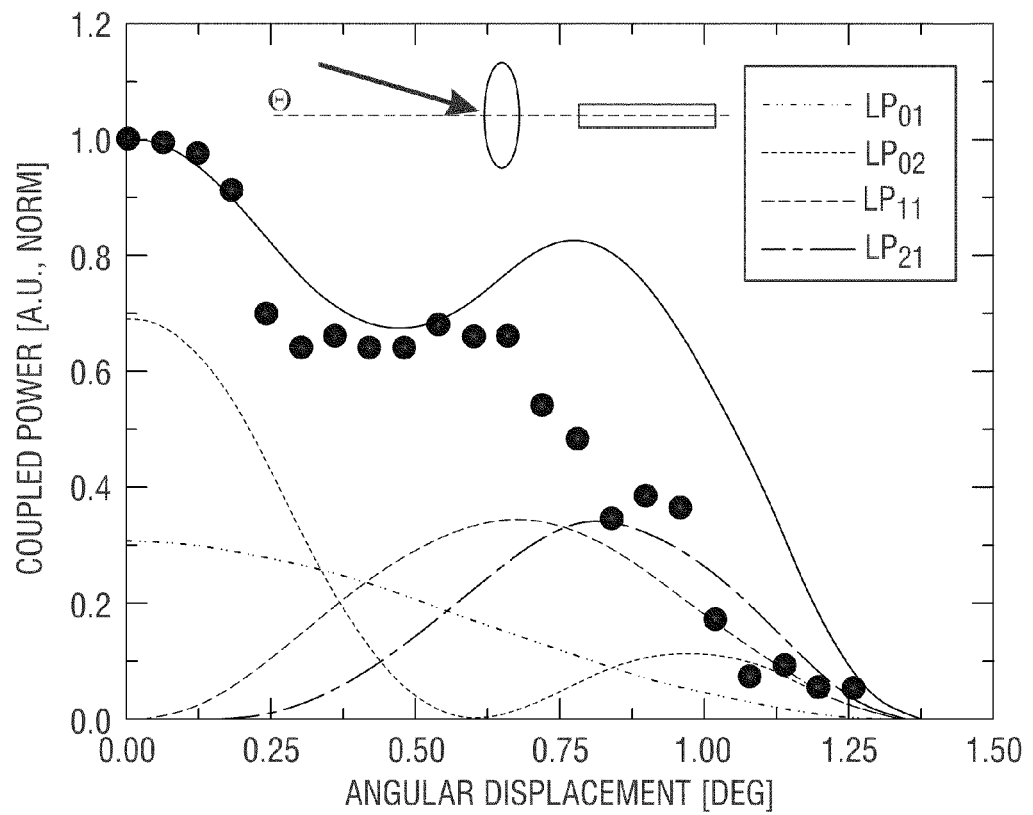
FIG. 5A illustrates an exemplary result of lens-waveguide coupling based on Stavenga's semi-analytical method.

The present invention contemplates that various design methodologies may be used for the ommatidium structure. For example, when the length-scales of the objects are much bigger than the wavelength, ray-tracing may be used. As the dimensions of the microlenses and waveguides shrink, diffraction and waveguiding effects may be taken into consideration. Numerical modeling of structures measured in tens of microns, may be prohibitively time and computation resource-consuming. One alternative is to use a semi-analytical treatment proposed by Stavenga (D. G. Stavenga, "Angular and spectral sensitivity of fly photoreceptors. I. Integrated facet lens and rhabdomere optics," J. Comp. Physiol. A v. 189, p. 1, 2003; D. G. Stavenga, "Angular and spectral sensitivity of fly photoreceptors. III. Dependence on the facet lens F-number and rhabdomere type in *Drosophilia*," J. Comp. Physiol. A. v. 189, p. 1892, 2003; D. G. Stavenga, "Angular and spectral sensitivity of fly photoreceptors. III. Dependence on the pupil mechanism in the blowfly *Calliphora*," v. 190, p. 115, 2004). In the treatment, the ommatidium structure is abstracted by an assembly of circular microlens and a cylindrical waveguide separated by a spacer. The angular sensitivity of the lens-waveguide coupling process is evaluated by an integral relation which includes both diffraction and waveguiding effects. FIG. 5A illustrates one example of its evaluation assuming 300 µm diameter microlens and 28 µm thick waveguide formed in n~1.5 material with 150 µm separation. It exhibits a good agreement with the experimental results, confirming its validity.

Figure 5B:
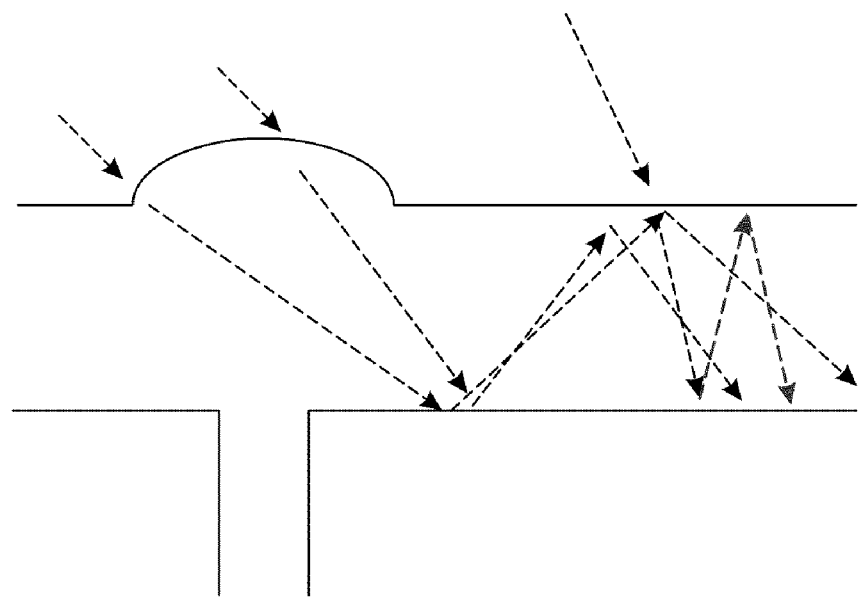
FIG. 5B illustrates the impact of stray light.
Figure 5C:
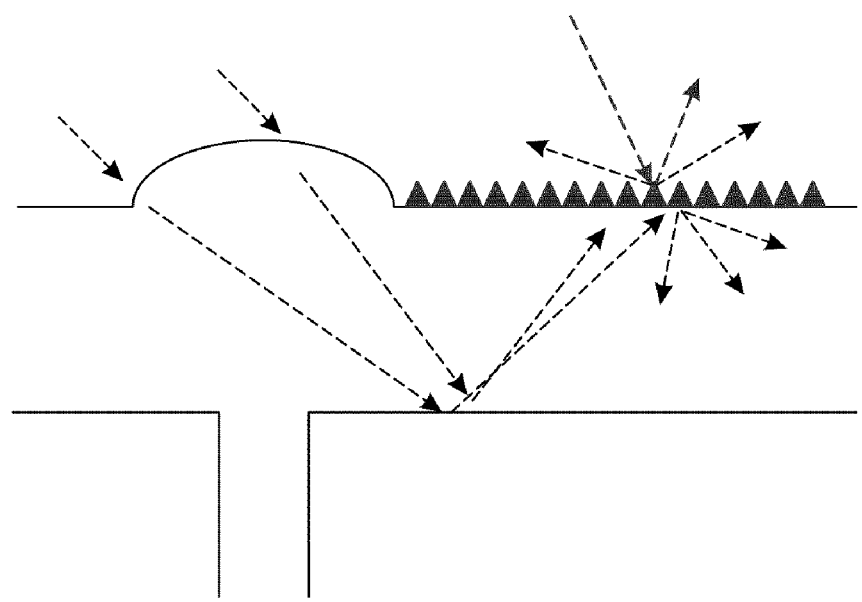
FIG. 5C illustrates its suppression using surface texturing.
Figure 5D:
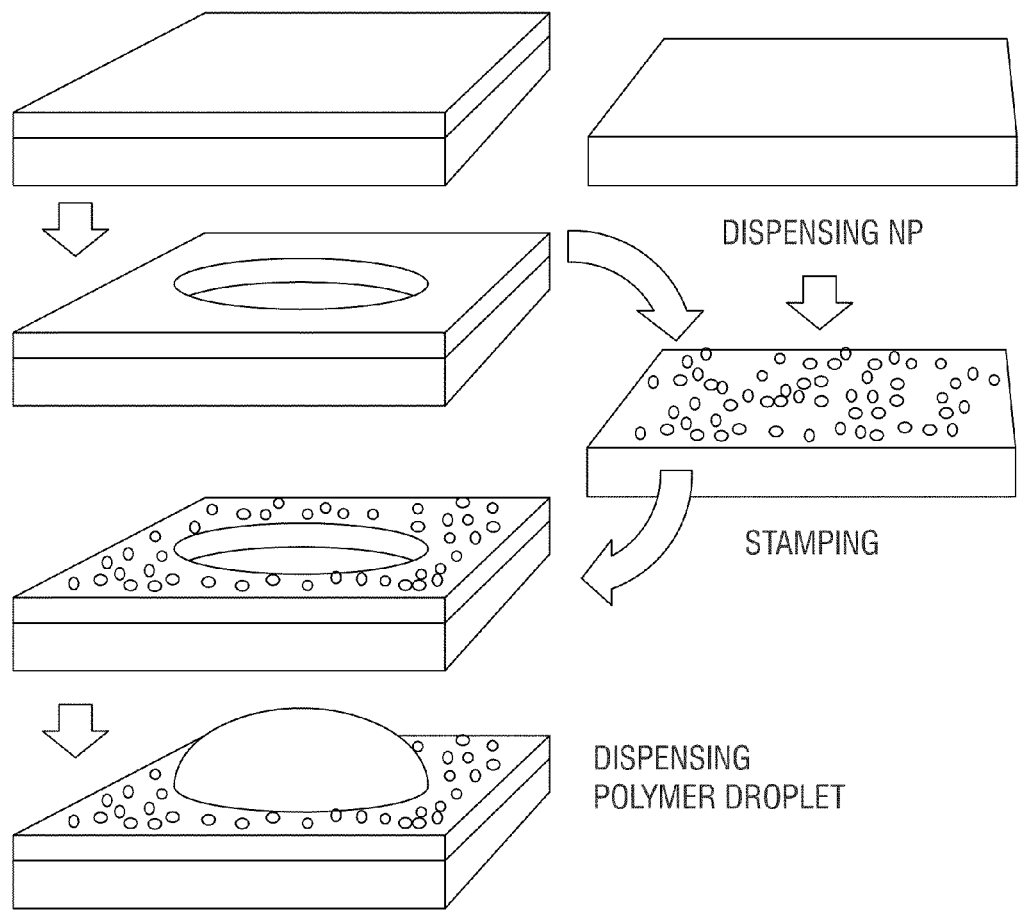
FIG. 5D illustrates a procedure for fabricating textured surfaces based on nanoparticle (np) stamping.

Another important factor is the impact of stray light described in FIG. 5B. The thickness of the upper elastic membrane will be often thin enough to "guide" the light not coupled into the fibers or leaks through the space between the microlenses. These can result in noise and crosstalk. In biological compound eyes, the space between facet lenses is covered with brush-like nanostructures called microtrichia. A similar structure may be used to reduce the stray light as shown in FIG. 5C. To do so, additional fabrication procedures (such as shown in FIG. 5D) may be added between the steps of FIGS. 4B and 4C. As shown, nanoparticles are stamped in the areas between the microlenses. When the microlenses are replicated, the nanopatterns will also be replicated and function as a scattering surface later in the final structures. Shapes and dimensions may be optimized to provide for the best crosstalk suppression.

According to another aspect of the present invention, the ability to change the curvature of the elastic membrane while maintaining the optical connection provides an elegant way of tuning the FOV dynamically. A number of different methods may be used to achieve dynamic tuning These may include, without limitation, pneumatic/fluidic methods, thermal actuation methods, and hydrogen-based methods. Using a pneumatic/fluidic method the membrane can be inflated (deflated) by applying positive (negative) pressure using air or fluid. Such a methodology has been used for optical MEMS devices including tunable lenses and focal planes. In such a methodology a separate source of pressure is used. In thermal actuation, the chamber may be filled with material with high thermal expansion. PEG, the sacrificial material has been used as a thermo-expanding material. Thus, PEG may potentially be used both as the molding master and the active material. In a hydrogel methodology, the hydrogels provide alternative means of inducing volume change, but may hinder the motion of the polymer fibers.

In addition, when liquid-phase material is used to induce the volume change, its optical properties should be considered. The index of the filling material should be lower than that of the polymer fibers to enable waveguiding action. In addition, the purpose of detection should be taken into consideration. For example, thermal actuation can be detrimental to IR detection and should be avoided.

Figure 6A:
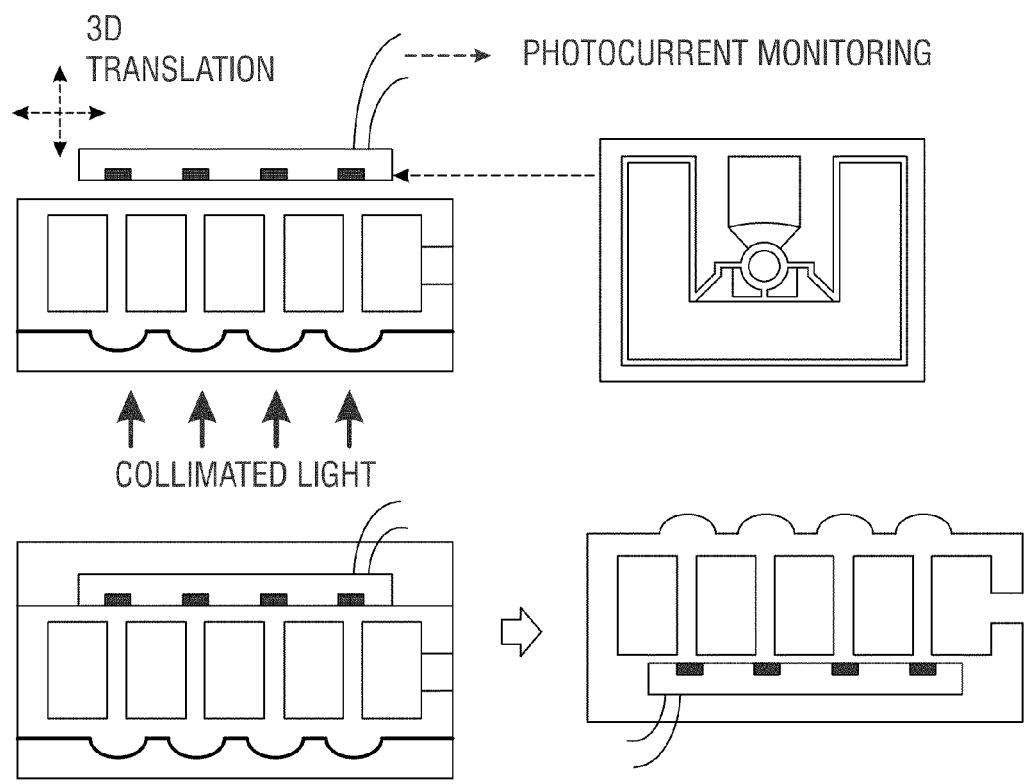
FIG. 6A illustrates a procedure for integrating a flat optical detector array with the wide FOV imaging platform.
Figure 6B:
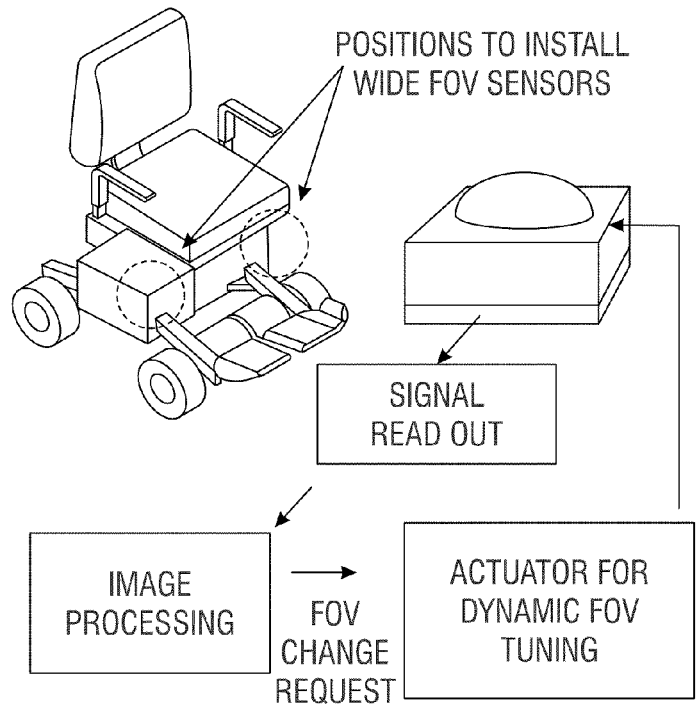
FIG. 6B provides an illustration of the method of using the wide FOV imaging device for wheel-chair collision avoidance.
Figure 6C:
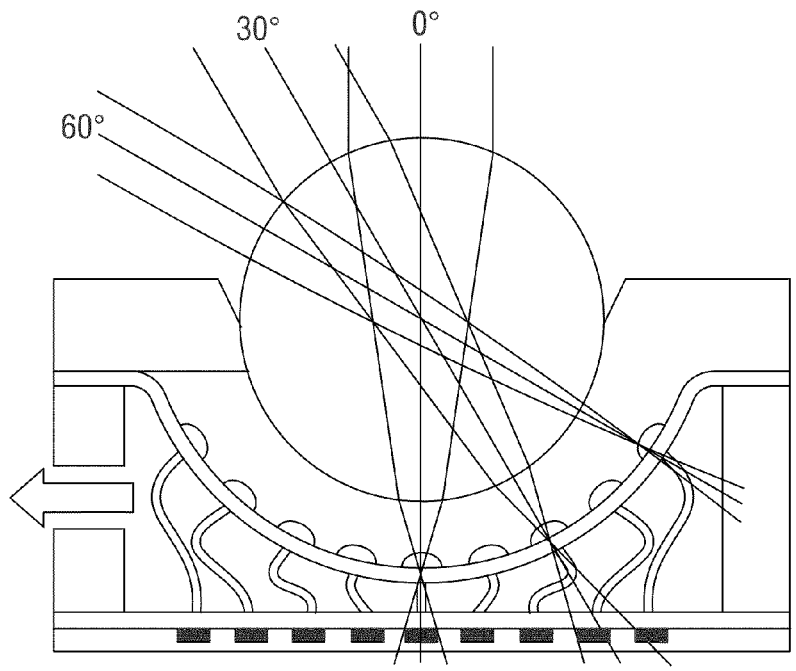
FIG. 6C is a schematic view of an artificial cephalopod eye implemented based on the concave utilization of the imaging platform. Ray tracing results are superimposed.

FIG. 6A illustrates one example of a procedure which may be used for integrating a flat optical detector array with the wide FOV imaging platform. In step 6A, the detector array is aligned to the distal ends of the illuminated fibers by monitoring the photocurrent and maximizing it through 3D translation. In step 6B the detector array is placed on the thin layer and another layer of PDMS is poured. In step 6C, after dissolving the template an imaging device with encapsulated detector array is formed. In FIG. 6B, an example of an application where the wide FOV imaging device is used for wheelchair collision avoidance. FIG. 6C is a schematic view of an artificial cephalopod eye implemented based on the concave configuration of the imaging platform. Ray-tracing results are superimposed. The diameter of the spherical lens may be 1 mm.

It is to be understood that the present invention may be used in numerous applications. For example, the present invention may be used in biomedical applications such as to provide an endoscope with a variable FOV. The present invention may be used in assistive technology applications such as an omnidirectional sensor for wheel-chair control, or an artificial retina or artificial octopus eye. The present invention may also be used in defense and security applications such as to provide omni-directional sensors for Unmanned Aerial Vehicles (UAVs). These are merely some of the applications which may use the present invention.

Therefore, an optical MEMS interface for highly curved focal plane arrays and imaging systems which use such interface have been disclosed as well as associated methods and systems. It is to be understood that although specific embodiments are described herein, numerous variations, options, and alternatives are contemplated. For example, variations in the materials used are contemplated, variations in the manufacturing process are contemplated, and variations in the structure of various embodiments of imaging systems which use an optical MEMS interface are contemplated. The present invention is not to be limited to the specific embodiments described herein.

What is claimed is:

1. An optical micro-electro-mechanical systems (MEMS) structure, comprising:
   an elastomer membrane;
   a plurality of polymer fibers attached to the elastomer membrane;
   an array of detectors operatively connected to the plurality of polymer fibers at a first end of the plurality of polymer fibers; and
   a microlens array operatively connected to the plurality of polymer fibers at a second end of the plurality of polymer fibers.

2. The optical MEMS structure of claim 1 further comprising a hollow chamber between the elastomer membrane and the array of detectors, the plurality of polymer fibers extending through the hollow chamber.

3. The optical MEMS structure of claim 2 wherein the elastomer membrane has a curvature.

4. The optical MEMS structure of claim 3 wherein the curvature is controllable by inflation or deflation to provide active curvature control.

5. The optical MEMS structure of claim 3 wherein the curvature of the elastomer membrane defines a field-of-view.

6. The optical MEMS structure of claim 5 wherein the field of view is approximately 150 degrees or greater.

7. The optical MEMS structure of claim 3 wherein the curvature of the elastomer membrane is a convex curvature.

8. The optical MEMS structure of claim 3 wherein the curvature of the elastomer membrane is a concave curvature.

9. The optical MEMS structure of claim 2 further comprising light-absorbing fluids disposed within the hollow chamber.

10. The optical MEMS structure of claim 1 wherein the polymer fibers comprise polydimethylsiloxane (PDMS).

11. The optical MEMS structure of claim 1 wherein the elastomer membrane comprises polydimethylsiloxane (PDMS).

12. The optical MEMS structure of claim 1 wherein the polymer fibers are sufficiently elastic to withstand over 200 percent elongation.

13. The optical MEMS structure of claim 1 wherein the polymer fibers and the elastomer membrane are simultaneously fabricated in a lost wax molding process.

14. A dynamically tunable field-of-view (FOV) imaging device, comprising:
   a detector array;
   a hollow chamber;
   an elastic membrane;
   a lens array arranged on the elastic membrane;
   a plurality of flexible optical connections between the detector array and the elastic membrane and extending through the hollow chamber;
   wherein the field-of-view is dynamically tunable by inflating or deflating the hallow chamber to affect geometry of the elastic membrane.

15. The device of claim 14 wherein the geometry is a convex shape and wherein the associated field of view is greater than 150 degrees.

16. The device of claim 14 wherein the hollow chamber is filled with a fluid.

17. The device of claim 14 wherein the hollow chamber is filled with a high thermal expansion material.

18. The device of claim 17 wherein the high thermal expansion material is polyethylene glycol (PEG).

19. The device of claim 14 wherein the hollow chamber is filled with hydrogel.

20. A method of manufacturing an optical micro-electromechanical system (MEMS) structure, the method comprising:
   forming a hollow polydimethylsiloxane (PDMS) chamber in which PDMS fibers extend from top to bottom of the PDMS chamber using a lost wax molding process.

21. The method of claim 20 wherein the lost wax molding process uses polyethylene glycol (PEG) as a sacrificial material.

22. The method of claim 20 wherein an elastic membrane forms a top surface of the PDMS chamber, the method further comprising attaching the PDMS fibers between a microlens array on the elastic membrane and an array of detectors on an opposite side of the PDMS chamber.

* * * * *

UNITED STATES PATENT AND TRADEMARK OFFICE
CERTIFICATE OF CORRECTION

PATENT NO.        : 8,351,106 B2
APPLICATION NO.   : 13/180668
DATED             : January 8, 2013
INVENTOR(S)       : Jaeyoun Kim It is certified that error appears in the above-identified patent and that said Letters Patent is hereby corrected as shown below:

Col. 8, Claim 14, line 5:
DELETE after the "hallow"
ADD after the --hollow--

Signed and Sealed this
Fifth Day of March, 2013

Teresa Stanek Rea
*Acting Director of the United States Patent and Trademark Office*